United States Patent
Bowen

Patent Number: 5,774,719
Date of Patent: Jun. 30, 1998

[54] METHOD FOR COMPARING DATA STRUCTURES THAT CROSS ADDRESS SPACE BOUNDARIES

[75] Inventor: Steven J. Bowen, Littleton, Mass.

[73] Assignee: Digital Equipment Corporation, Maynard, Mass.

[21] Appl. No.: 2,168

[22] Filed: Jan. 8, 1993

[51] Int. Cl.$^6$ .................................................. G06F 13/00
[52] U.S. Cl. ..................................... 395/680; 395/200.33
[58] Field of Search ................................ 395/800, 700, 395/650, 600, 500, 200, 375, 800.01, 200.3, 200.33, 200.38, 200.66, 200.68, 200.76, 701, 610, 670, 680, 684

[56] References Cited

U.S. PATENT DOCUMENTS

| | | | |
|---|---|---|---|
| 5,187,790 | 2/1993 | East et al. | 395/725 |
| 5,247,676 | 9/1993 | Ozur et al. | 395/650 |
| 5,249,293 | 9/1993 | Schreiber et al. | 395/650 |
| 5,307,490 | 4/1994 | Davidson et al. | 395/650 |

OTHER PUBLICATIONS

Kernighan, Ritchie, *The C Programming Language,* 1978 (Prentice–Hall New Jersey). See specifically, chapter 6 and Appendix A, section 8.5.

Rosenberry, Kenney and Fisher, *Understanding DCE,* 1992 (O'Reilly and Associates, Inc., Sebastol, Cal.)

*Primary Examiner*—Alpesh M. Shah
*Attorney, Agent, or Firm*—Anne E. Saturnelli; Arthur W. Fisher

[57] ABSTRACT

A method in accordance with the invention involves the normalization of a C language-type data structure received by a process in a distributed computing environment (DCE) to ensure that padding bits are consistently used. The method steps may advantageously be performed by a client process prior to and subsequent to a remote procedure call (RPC) to ensure that the padding bits are not undesirably changed as a result of the RPC. The method steps can also be performed by a server process to ensure that the structures it receives in RPCs are consistent in their use of padding bits. Normalization of the data structure permits a memcmp( ) or similar comparison function to be used to compare data structures without the risk that dissimilar padding bits will result in a false negative from the comparison.

8 Claims, 2 Drawing Sheets

METHOD FOR COMPARING DATA STRUCTURES THAT CROSS ADDRESS SPACE BOUNDARIES

BACKGROUND OF THE INVENTION

Cross-Reference to Related Application

The following is a related application being filed contemporaneously and commonly assigned, namely:

"DCE Remote Procedure Call Server Scheduling Mechanism for Use with Legacy-Type Application Programs," by William B. Drury and Yua-Ping Hsu, Ser. No. 08/002,197;

Overview

The invention relates to the efficient comparison of logical data structures in different address spaces to produce consistent results, notwithstanding the possible use of different padding bits in different address spaces and/or in "marshalling" mechanisms that transfer data structures from one address space to another. More specifically, the invention relates to a method of normalizing the padding bits used in C language data structures, which may have originated in an address space other than the address space in which the comparison is performed.

The method advantageously reduces the incidence of false negatives in, e.g., a distributed computing environment (DCE) such as that defined by specifications promulgated by the Open Software Foundation (OSF). Such reduction permits remote procedure calls (RPCs) involving data structures to be used more efficiently.

Background: Padding of Gaps Between Members of Data Structures

Computers often deal with information in blocks of data organized in specified formats. For example, in the C programming language one type of data block is referred to as a "structure" that is made up of "members"; in the PASCAL language the analogous concepts are "records" and "fields." The well-known book by Brian W. Kernighan and Dennis M. Ritchie, The C Programming Language (1st ed. Prentice Hall 1978), hereinafter "[K&R]," is incorporated herein by reference as nonessential background information known to those of ordinary skill, especially chapter 6, "Structures," and section 8.5 of Appendix A, "Structure and union declarations."

A C-language structure can include a variety of data types as members. As explained in [K&R] Appendix A, section 8.5, a structure member that is defined as consisting of a specified number of bits is referred to as a "field member" of the structure. Other structure members, defined for example as being of type "int"[eger] or "char"[acter], are referred to as non-field members of the structure.

The physical encoding of C-language data structure members is important in the context of the present invention. Field members, which as noted above consist of a specified number of bits, are packed into machine integers and do not overlap or straddle data storage words. Non-field members are encoded into storage beginning at an appropriate addressing boundary for the data type of the member in question, e.g., a particular non-field member may be encoded into physical storage starting at the beginning of a data "word."

Gaps can sometimes occur in physical data storage between the end of one structure member and the beginning of the next structure member; these gaps are normally filled with "padding, " i.e., the physical storage of the gaps are encoded with nonmeaningful padding bits.

The foregoing discussion is illustrated in FIG. 1. A portion 101 of a computer system's physical data storage may be divided by the system control programming into a plurality of sequential "words" such as words 103 and 105. That portion 101 might be used to encode a C structure that is defined as including a name field 107 and a street field 109, wherein the two fields cannot both fit into a single word 103 or 105. As a result, padding bits 108 and 110 are used to pad out the name field 107 so that the street field 109 starts at the beginning of the word 105.

False Negatives in Distributed-Computing Memcmp() Comparisons

Because padding bits in and of themselves have no local importance with respect to any given local computer environment, different bit patterns can be used for padding in different environments. The padding bits used to fill structure gaps do become significant, however, if a data structure is passed from one environment to another, as frequently happens in a distributed computing environment (DCE). In particular, the use of different padding bits in different computing environments can complicate the performance of a very common computing operation, namely the comparison of two structures, if one or both of the structures originates in a different environment than the environment in which the comparison is being performed.

One way of comparing two structures is to compare correlative members individually. For example, a comparison of two driver's licenses (structures) might involve, inter alia, individual comparisons of the members that contain the names, then the members that contain birth dates. However, this conceptually simple method might be highly inefficient because of the overhead incurred by the repetitive function calls to the compare function.

A more efficient comparison may be to compare entire data structures rather than individual members. Such a comparison treats a data structure as a unit, and one function call compares every bit between the two structures structure, including the padding bits. A well-known standard function for accomplishing this in modern C implementations is the "memcmp( )" function.

In a distributed computing environment, however, a memcmp( ) comparison can be adversely affected by padding-bit "corruption" that can occur as a side effect of calls to remote "server" processes. As is well known to those of ordinary skill, the term "process" refers generally to the execution by a physical processor (or processor system) of one or more series of instructions in a specified "address space," i.e., a system environment that includes particular physical resource allocations, open files, static data, etc. In particular, a problem can occur if a data structure's padding bits are altered in the course of being transferred to or from a remote "server" process. The transfer mechanism may modify the padding bits. If the padding bits are "corrupted" in this way, it follows that the more efficient whole-structure method of comparison results in a false negative.

Referring again to FIGS. 1 and 2 for purposes of illustration, the padding bits 108 and 110 are assumed to conform to a specified pattern, referred to as $PAD_A$, in the originating environment, referred to here as a "client" process. Assume that the client process makes a remote procedure call (RPC) to a remote server process to request that services involving the structure be performed, e.g., updating the structure to incorporate changed data.

Now assume that a marshalling process 210 alters the padding bits from the original bit pattern $PAD_A$ to a pattern $PAD_B$, as could easily happen, e.g., in an OSF DCE environment if the host machine executing the server process utilizes data whose byte order is the reverse of that used by the client process host. Finally, assume that the structure is ultimately returned to the client process with the new pattern $PAD_B$.

If the client process were to use the memcmp( ) function to compare the structure with another structure having the same field values but different padding bits—e.g., a comparison with a copy of the "old" structure to determine whether any changes had been made as a result of the RPC—then a false negative could result, i.e., the comparison would report that the two structures were nonidentical even though they were indeed identical in their significant bits.

SUMMARY OF THE INVENTION

The present invention is one in which recognition of the problem described above leads almost immediately to a comparatively simple solution. Of course, the hindsight simplicity of the solution does not negate the nonobvious nature of the invention as a whole.

A method in accordance with the invention involves the normalization of a data structure to ensure that padding bits are consistently used. The method steps may advantageously be performed by a client process prior to and subsequent to a remote procedure call to ensure that the padding bits are not undesirably changed as a result of the RPC. The method steps can also be performed by a server process to ensure that the structures it receives in RPCs are consistent in their use of padding bits.

DETAILED DESCRIPTION OF SPECIFIC EMBODIMENTS

A client process that is to generate an RPC involving a data structure, or a server process that is to perform services in response to an RPC to the server process that involves a data structure, initializes the data structure with zeros in all padding-bit positions. This may be conveniently accomplished by first initializing the data structure to a 0 value in all bits using the standard C memsetO function before assigning values to the structure's members. Such initialization ensures that the padding bytes of all purely local data structures will be all zeros.

Figure 1:
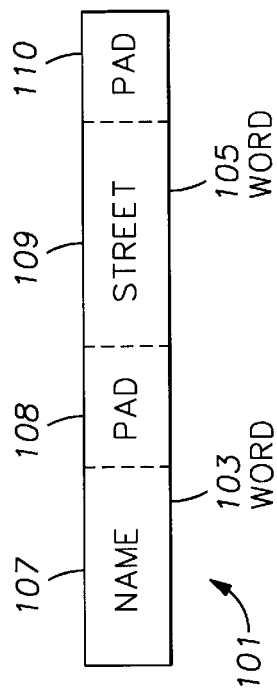
FIG. 1 is a greatly simplified illustration of a hypothetical structure.
Figure 2:
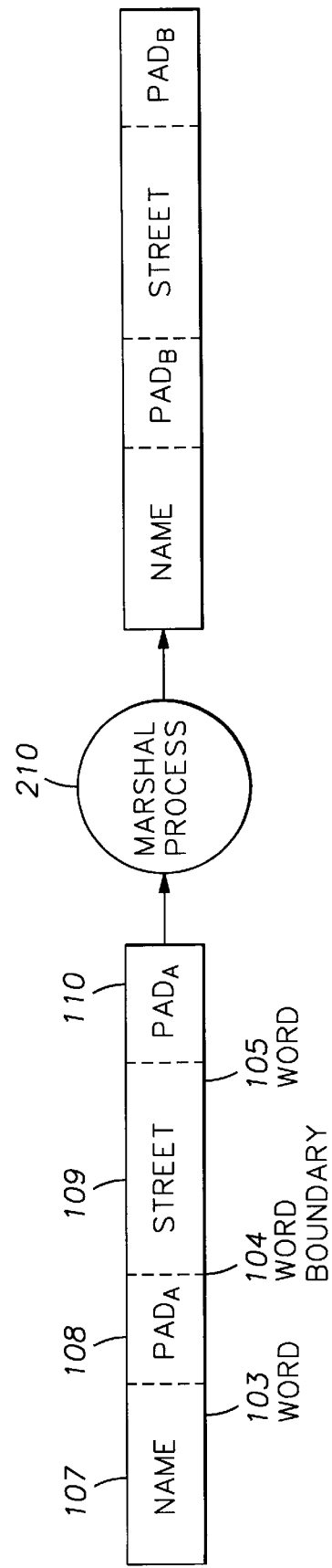
FIG. 2 is a data flow diagram that shows "corruption" of padding bits by, e.g., a marshalling process.
Figures 3, 4:
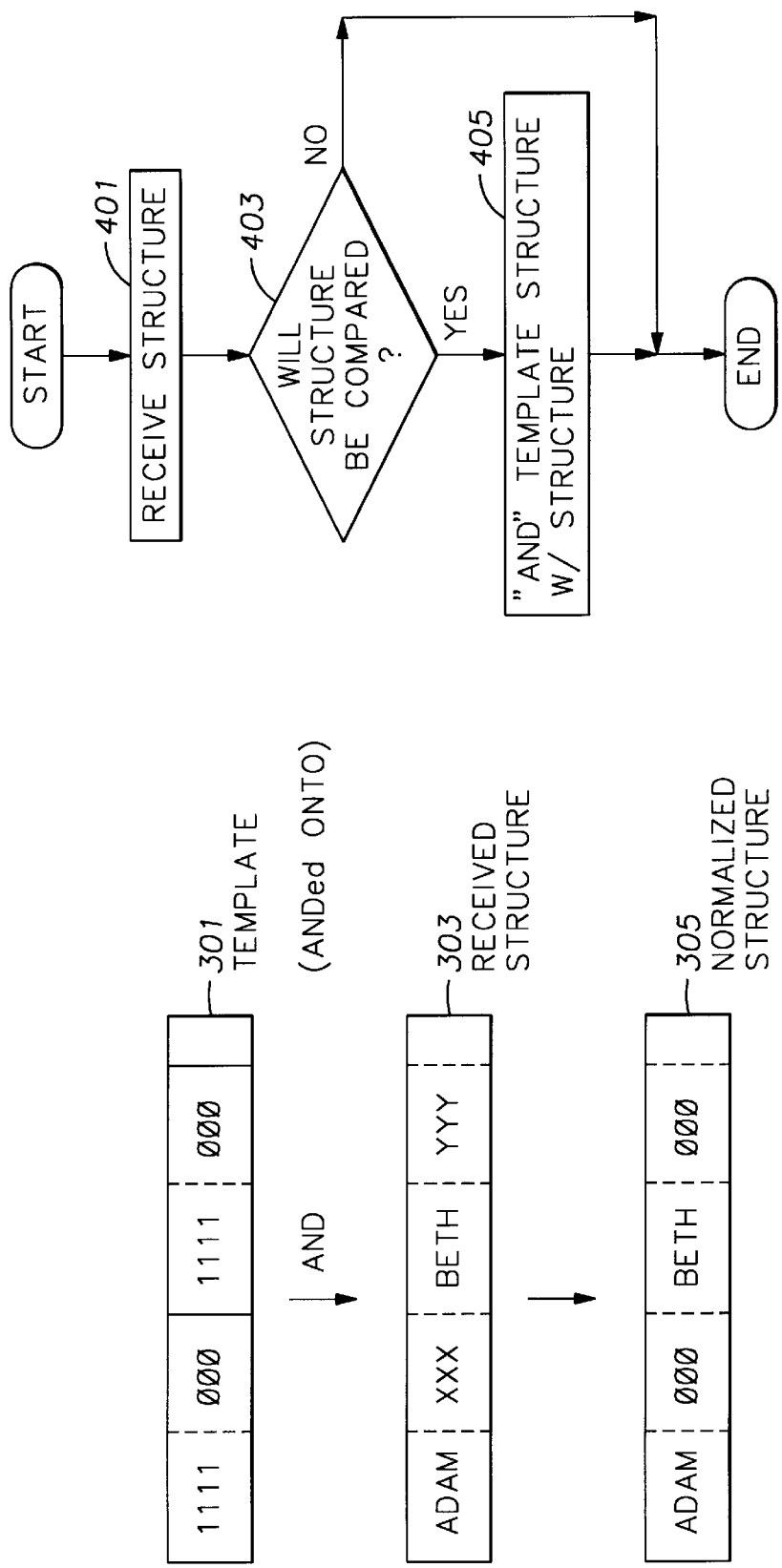
FIG. 3 is a simplified illustration of an ANDing process between a received data structure and a template data structure in accordance with the invention.
FIG. 4 is a simplified flow chart of illustrative method steps in accordance with the invention.

Referring to FIGS. 3 and 4, when a data structure is passed from one process (address space) to another, the receiving process receives the data structure in a conventional manner in block 401. The receiving process then resets all padding bits to all zeros in block 405. For example, a client process that receives a data structure from a server process as a result of a remote procedure call by the client resets all padding bits in the received data structure to 0. Likewise, a server process that receives a data structure as part of an RPC from a client process resets all padding bits in the received data structure to 0.

The resetting of padding bits in the received data structure may be conveniently accomplished (block 405) by ANDing the received data structure 303 with a template structure 301, identical in format to the received data structure (whose format is assumed to be known a priori as part of the receiving process's knowledge of the RPC format), in which member bits are set at 1 and padding bits are set to 0. In the normalized (ANDed) data structure 305, all member bits remain identical to those in the received data structure 303 because any variable logically ANDed with a 1 yields a result of the original variable; and all padding bits are reset to 0 because any variable logically ANDed with a 0 results in a 0. The ANDed data structure 305 is thereafter used in the place of the original received data structure 303 (in many conventional implementations the template structure 301 will be destructively ANDed onto the received data structure 303 to produce the normalized data structure 305).

The method may be optimized in several ways. For example, to reduce the overhead associated with the template initialization, the template structure may be defined as a static variable that is initialized only once in the life of the process in question. As another example, if desired the method steps may be performed only for received data structures that are to be used as operands of a memcmp( ) or other comparison function (or with any other function in which the presence of nonconforming padding bits may affect the operation or outcome of the function), instead of with all received data structures, as shown at decision block 403.

An illustrative implementation of the method might take a form such as the hypothetical computer program fragment reproduced in the Appendix.

A programmer developing a client or server program to implement the method could explicitly code the method steps into the program during the development process. Alternatively, the method steps could be implemented transparently to the programmer via a suitable compiler design. For example, suppose that the source code of a client program includes a statement invoking an RPC which returns a data structure. The compiler for the source code could be conventionally designed so that any such source-code statement is translated into executable code that includes code for performing the method steps upon the returned data structure.

It will be noted by those of ordinary skill having the benefit of this disclosure that the method involves tradeoffs of time and storage space. By ANDing each received structure against its template after each data transfer, the total time of the transfer is increased. The method thus is most beneficial when comparisons of structures having large numbers of members are performed, or stated more generally, when the aggregate cost in time and resource usage of field-by-field comparisons exceeds that of comparisons using the method steps and a memcmp( ) function.

It will be similarly noted that if a structure contains a member that is a pointer to another data store, two structures can have nonidentical pointer members to data in different locations but of identical content. In such an event a memcmp( ) will a return false, indicating that the structures are not identical, even though the referenced data are identical. The method steps do not address this situation.

It will be appreciated by those of ordinary skill having the benefit of this disclosure that numerous variations from the foregoing illustration will be possible without departing from the inventive concept described herein. For example, those of ordinary skill having the benefit of this disclosure will recognize that logical functions described above as being implemented in software can equivalently be implemented in hardware, e.g., through the use of discrete logic circuitry, and vice versa; likewise, a general-purpose processor operating under program control could equivalently be replaced by one or more special-purpose chips designed to perform the programmed functions; and so forth.

Accordingly, it is the claims set forth below, and not merely the foregoing illustration, which are intended to define the exclusive rights claimed in this application.

```
5. APPENDIX
typedef struct {
      char empl_number[10];
      char empl_name[30];
      char empl_street_address[30];
      char empl_city[20];
      char empl_state[2];
      char empl_zip_code[5];
}
EMPLOYEE_REC;
...
/* prototype for function to mask out padding bits */
static void mask_rec(EMPLOYEE_REC *wksp);
...
void add_employee_task()1 {
...
EMPLOYEE_REC *rec1;
EMPLOYEE_REC *rec2;
...
rec1 = (EMPLOYEE_REC *)malloc(sizeof(EMPLOYEE_REC));
rec2 = (EMPLOYEE_REC *)malloc(sizeof(EMPLOYEE_REC));
...
/* call mask_rec for each record to start out clean */
mask_rec(rec1);
mask_rec(rec2);
...
         /* the following call is a RPC */
tsp_empl_server_epv_c.add_empl_info((EMPLOYEE_REC *)
rec1);
         /* then call mask_rec with rec1 to clean up
         padding bits after RPC */ mask_rec(rec1);
...
         /* rec1 and rec2 can now be compared via
memcmp() */
         if (memcmp(rec1, rec2, sizeof(EMPLOYEE_REC)) ==
         0) {
         ...
         }
...
free(rec1);
free(rec2);
return;
}
/* mask function for EMPLOYEE_REC */
static void mask_rec(EMPLOYEE_REC *wksp)  {
int i;
char *ptr, *maskptr;
static int initialized = 0;
static char zeros = 0;
static char ones = ~0;
static EMPLOYEE_REC mask;
if (!initialized) {
initialized = 1;
memset(&mask, zeros, sizeof(mask));
memset(&(mask.empl_name), ones, sizeof(mask.empl_name));
memset(& (mask.empl_street_address), ones,
sizeof(mask.empl_street_address));
memset(&(mask.empl_city), ones, sizeof mask.empl_city));
memset(&(mask.empl_state), ones; sizeof(mask.empl_state));
memset(&(mask.empl_zip_code), ones,
sizeof(mask.empl_zip_code));
}
ptr = (char *)wksp;
maskptr = (char *)&mask;
for (i=0; i<sizeof(mask); i++)
ptr[i] = ptr[i] & maskptr[i];
return;
}
```

What is claimed is:

1. A method, executed by a first process in a first computer system, of normalizing a data structure having a first member definition structure which includes at least one member and at least one padding bit, said data structure being transmitted to the first process from a second process executing in a second computer system using a remote procedure call, comprising the steps of:

(a) receiving, on said first computer system, the data structure;

(b) performing, by said first process in said first computer system, a logical bitwise AND operation of the data structure with a template structure and producing a normalized data structure, said template structure having a second member definition structure equivalent to the first member definition structure and having member bits set to 1 and padding bits set to 0; and (c) replacing the data structure with the normalized data structure.

2. The method of claim 1 further comprising the step of comparing said normalized data structure with another data structure and obtaining comparison results which indicate if said data structures have equivalent member bits.

3. The method of claim 2, wherein said comparing step comprises calling a comparison function to compare said data structures.

4. The method of claim 2, wherein said comparing step comprises comparing corresponding individual members of said data structures.

5. The method of claim 2, wherein said comparing step comprises comparing said data structure as a first contiguous unit to said other data structure as a second contiguous unit.

6. The method of claim 1, wherein said first process comprises machine instructions produced by translation of source code.

7. A client-process method of obtaining performance of a service from a server process, where the performance of the service results in the return of a data structure having a first member definition structure which includes at least one member and at least one padding bit, comprising the steps of:

(a) invoking the server process from a client process;

(b) receiving, by said client process, the data structure;

(c) performing, by said client process, a logical bitwise AND operation of the data structure with a template structure and producing a normalized data structure, said template structure having a second member definition structure equivalent to the first member definition structure and having member bits set to 1 and padding bits set to 0; and (d) replacing the data structure with the normalized data structure.

8. A server-process method of performing a service requested by a client process that passes as a parameter a data structure having a first member definition structure which includes at least one member and at least one padding bit, comprising the steps of:

(a) receiving, by a server process, the data structure;

(b) performing, by said server process, a logical bitwise AND operation of the data structure with a template structure and producing a normalized data structure, said template structure having a second member definition structure equivalent to the first member definition structure and having member bits set to 1 and padding bits set to 0;

(c) replacing the data structure with the normalized data structure; and (d) performing the requested service using the normalized data structure.

* * * * *